Aug. 17, 1965     W. E. CURRIE     3,201,153

FLARELESS TUBE COUPLING FOR PLASTIC OR METAL TUBING

Filed May 15, 1961

*INVENTOR.*
WILLIAM E. CURRIE
BY
Oberlin, Maky & Donnelly
ATTORNEYS 3,201,153
FLARELESS TUBE COUPLING FOR PLASTIC
OR METAL TUBING
William E. Currie, Cleveland Heights, Ohio, assignor to Parker-Hannifin Corporation, Cleveland, Ohio, a corporation of Ohio
Filed May 15, 1961, Ser. No. 110,197
3 Claims. (Cl. 285—249)

The present invention relates generally as indicated to a flareless tube coupling and more particularly to a coupling equally suited for use with polyethylene or like flexible plastic and metal tubes.

It is a principal object of this invention to provide a flareless tube coupling assembly which provides for three axially spaced zones of engagement of the ferrule thereof with the tube, to wit: a first zone whereat the axially inner end of the ferrule bites into strong gripping and fluid tight sealing engagement with the tube; a second zone axially spaced from the first zone whereat the ferrule is contracted into non-biting, frictional engagement with the tube; and a third zone at which, as in the second zone, there is non-biting, frictional engagement between the ferrule and the tube, but of magnitude less than at the second zone so as to provide for improved vibration resistance of the assembly.

It is another object of this invention to provide a flareless tube coupling assembly of the character indicated in which the ferrule is reversible (symmetrical on opposite sides of its medial trans-axial plane) but yet provides three different axially spaced zones of engagement of the ferrule with the tube irrespective of the endwise disposition of the ferrule between the coupling parts.

It is another object of this invention to provide a flareless tube coupling assembly in which the ferrule is provided with opposite relatively thin tubular end portions and an intermediate radially thicker portion joined by beveled edges to the respective end portions, one end portion being contracted to provide the aforesaid first zone of engagement with the tube, and the thickened mid-portion of the ferrule being undercut adjacent the beveled edges for radial contraction thereat to provide the aforesaid second and third zones of engagement with the tube.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 1:
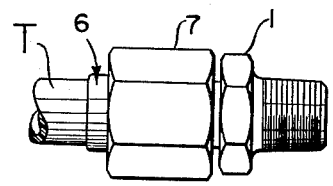
Figure 2:
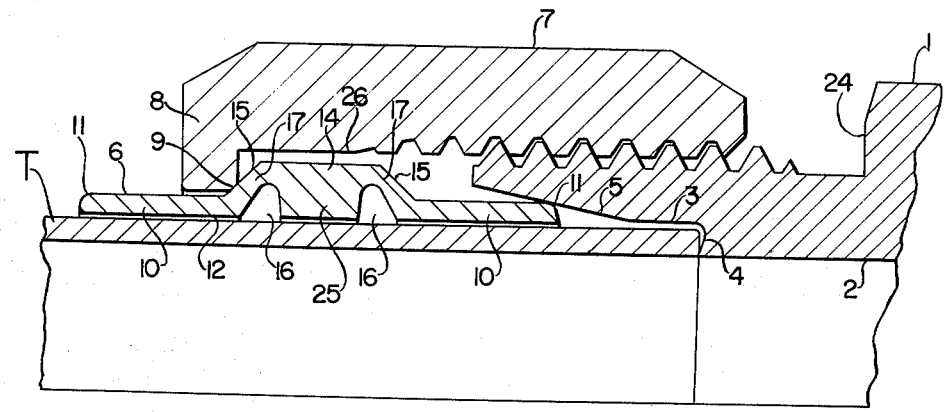
Figure 3:
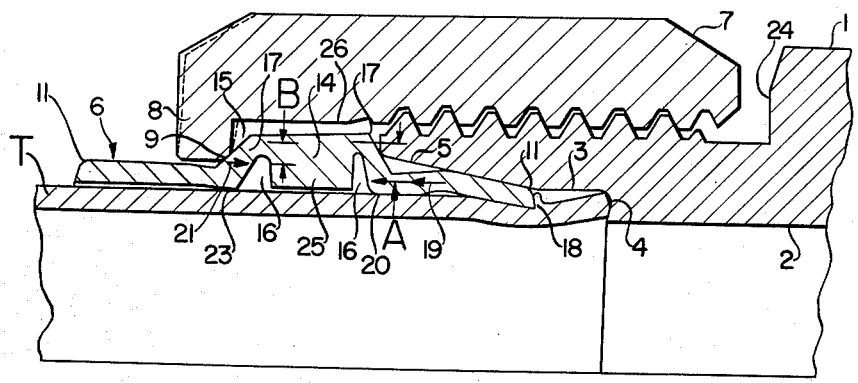

In said annexed drawing:

FIG. 1 is a side elevation view of a coupling embodying the present invention;

FIG. 2 is a fragmentary radial cross-section view on much enlarged scale of a flareless tube coupling in accordance with the present invention, the coupling parts being shown in finger-tight condition; and FIG. 3, like FIG. 2, is a much enlarged cross-section view showing the flareless tube coupling herein in its normally tightened condition, the ferrule thereof having been deformed into gripping and sealing engagement with the tube at said first zone and into frictional engagement with the tube at said second and third zones.

Referring now more particularly to the drawings, and first to FIGS. 1 and 2, the flareless tube coupling herein comprises an externally threaded body member 1 formed with a central bore 2 of diameter approximately equal to the inside diameter of the tube T which is to be coupled. The central bore 2 of the body member 1 is enlarged as at 3 to form a beveled abutment shoulder 4 for the end of the tube, the enlargement 3 terminating in a flare mouth 5 having wedge taper from about 12 to 15° (24° to 30° included angle) to constitute, as hereinafter explained, a cam surface which, upon axial movement of the ferrule 6 thereagainst, effects radial contraction of the axially inner end of the ferrule.

In threaded engagement with the body member 1 is a nut member 7 which terminates at its axially outer end in an inturned flange 8 which has a relatively narrow beveled edge 9 for engagement with the ferrule 6 as shown.

The ferrule 6 has opposite tubular end portions 10 with slightly rounded outer corners 11 and the bore 12 through the ferrule is preferably such as to have a slip fit (nominal .005″ radial clearance) over the tube T to be coupled. Between the thin end portions 10 of the ferrule is a radially thickened intermediate portion 14 which is joined to the end portions by oppositely beveled end faces 15, each preferably having a taper of about 45°. Adjacent the ends of the mid-portion 14, the ferrule 6 has a pair of oppositely disposed internal grooves 16 of which the nearest sides are normal or almost normal, as shown, to the ferrule axis and of which the farthest sides are beveled as shown, preferably at 60° angles, so as to be steeper than the adjacent beveled end faces 15. In other words, the thinnest portions 17 of the mid-portion 14 are almost at the major diameters of the grooves 16.

It is to be noted that the ferrule 6 is dimensioned so that when it is placed around the tube T and between the body member 1 and the nut member 7, one end portion 10 thereof will extend into the flare mouth 5 with the radially outer corner 11 engaged with the flare mouth 5 and the axially outer beveled face 15 will be engaged by the complemental edge 9 of the nut member 7. As the nut member 7 is tightened, the axially inner end portion 10 will be radially contracted to bite into the tube T to build up a holding shoulder 18. This provides the aforementioned first zone whereat the tube T is firmly gripped and sealed. The axial reaction along the line 19 then acts through the moment arm A to effect contraction of the ferrule 6 at 20 to provide a second zone of gripping of the tube T without biting action and at a region axially spaced from holding shoulder 18. Then, as the nut member 7 is tightened more, the axial force at 21, acting through the moment arm B which is less than moment arm A, contracts the ferrule 6 at 23 to provide a third zone of gripping of the tube T spaced from the second zone 20 and at less magnitude than said second zone. Finally, the axially inner beveled face 15 engages the end of the body member 1 to form a yieldable stop to preclude over-tightening of the nut member 7 and excessive deformation at the first and second zones. When the coupling is assembled as in FIG. 3 there is a sharp rise in nut torque to signal the operator that the joint is properly made up. Of course, continued tightening of nut member 7 beyond the FIG. 3 condition will effect only slightly additional contraction at the third zone 23 owing to the short moment arm B and the relatively steep 45° slope of the axially outer beveled face 15 (axial and radial force components approximately equal). Likewise, such continued tightening of the nut will result in but little increase in the contraction of the sleeve at the other two zones adjacent holding shoulder 18 and contracted portion 20. Thus excessive contraction of the tube at any of the three zones is avoided even when the nut is over-torqued. Because most of the excessive torque is applied to the substantially solid column of metal provided by the largest diameter portion of sleeve 14, nut flange 8 will be deflected rearwardly to the position shown in dotted lines in FIG. 3 before excessive contraction or damage to sleeve 14 occurs.

Gripping of the tube T at the three axially spaced zones at progressively decreasing intensity and over a length of the tube which is approximately equal to, or greater than, the diameter of the tube, excellent vibration resistance is achieved and, moreover, relatively weak tubes T of polyethylene or like flexible plastic are very firmly gripped. The axially outer and portion 10 also imports improved vibration resistance to the assembly.

It is to be noted that because both ends 10 and the mid-portion 14 of the ferrule 6 are symmetrical about a transverse plane through the middle, the ferrule 6 may be reversed end for end, and despite such reversal, the assembly results will be as depicted in FIG. 3.

A distinct advantage of the provision of the axially spaced apart grooves 16 is that the remaining thickened area 25 resists bowing or expansion of the mid-portion 14 under the influence of the axial assembly forces, whereby no binding occurs between the outside of the ferrule 6 and the bore 26 of the nut member 7.

By way of example, a brass ferrule 6 for use with ½" diameter tube T of copper or polyethylene or like flexible plastic material may have end portions 10 of about .030" thickness and about ¼" length, and a mid-portion 14 of about .080" thickness and also about ¼" length. The thickness of the portions 17 may be about .025". To promote biting in of the ferrule 6 into a soft flexible tube T, the ends are of chisel-like form beveled at an angle of about 70° as shown.

Other modes of applying the principle of the invention may be employed, change being made as regards the details described, provided the features stated in any of the following claims, or the equivalent of such, be employed.

I therefore particularly point out and distinctly claim as my invention:

1. In a flareless tube coupling, the combination of a pair of threadedly engaged members defining therebetween an annular chamber that includes axially spaced end walls constituted by the respective members and of which at least one is a frusto-conical wedge surface; and a tubular ferrule in such chamber, the one end of said tubular ferrule adjacent said wedge surface having an outer diameter greater than the diameter of the radial inner end of said wedge surface and less than the diameter of the radial outer end of said wedge surface, whereby said one end of said ferrule will confront said wedge surface so as to be radially contracted thereby into sealing engagement with a tube adapted to be positioned within said ferrule when said ferrule is moved axially against said wedge surface, said ferrule being formed with a radially thickened portion axially spaced from such one end of said ferrule and said wedge surface, said other end wall of said threadedly engaged members having an inner diameter greater than said outer diameter of said one end of said ferrule and less than the outer diameter of said radially thickened portion, whereby one end of said radially thickened portion will contact said other end wall on a diameter greater than the diameter of contact between said one end of said ferrule and said wedge surface, said ferrule thus being moved axially upon screwing together of said members, the ends of said radially thickened portion being exteriorly beveled and interiorly undercut to provide deformable portions which are at least partially flattened, and thus radially contracted into tube gripping engagement upon application of axial forces on said ferrule, said undercutting constituting a pair of axially spaced internal annular groove means having a depth sufficient to provide such deformable portions as aforesaid, said radially thickened portion having a thick unrelieved portion between such annular groove means to resist outward bowing upon application of opposed axial forces on said ferrule.

2. The coupling of claim 1 wherein the nearest sides of said internal annular groove means are substantially normal to the axis of said ferrule and the furthest sides are beveled at a steeper angle than said exteriorly beveled end of said radially thickened portion, whereby the thinnest portions of said radially thickened portion of said ferrule between the ends thereof are at the major diameters of said annular groove means.

3. In a flareless tube coupling, the combination of a pair of threadedly engaged members defining therebetween an annular chamber that includes axially spaced end walls constituted by the respective members and of which at least one is a frusto-conical wedge surface; and a ferrule in such chamber, said ferrule having tubular portions at either end thereof, said tubular portions having an outer diameter greater than the diameter of the radial inner end of said wedge surface and less than the diameter of the radial outer end of said wedge surface, whereby the end of said ferrule which is adjacent said wedge surface will be confronted thereby so as to be radially contracted into biting engagement with a tube adapted to be positioned within said ferrule to form a strong and fluid-tight seal with said tube when said ferrule is moved axially against said wedge surface, said ferrule being formed with a radially thickened portion axially uniformly spaced between the ends of said ferrule, said radially thickened portion being exteriorly beveled at its ends and provided with interior undercut means adjacent said ends to provide deformable portions which are adapted to be at least partially flattened, and thus radially contracted thereat into non-biting frictional engagement with such tube at zones axially spaced from each other and from said one end of said ferrule, said ferrule being symmetrical from the axial middle of said thickened portion to the ends of said ferrule, said radially thickened portion being axially spaced from said wedge surface, the other of said axially spaced end walls having an inner diameter greater than said outer diameter of said ferrule tubular portions and less than the outer diameter of said radially thickened portion, whereby said radially thickened portion is engaged by said other end wall upon screwing together of said members, said one end wall thus contacting said one tubular end portion on a diameter less than the diameter of contact between said other end wall and said radially thickened portion, whereby the corresponding deformable portions at the ends of said thickened portion are thus radially contracted into non-biting frictional engagement with such tube as aforesaid under the influence of different moment arms, the deformable portion of said radially thickened portion adjacent said end which is engaged by said other end wall being contracted with a force the magnitude of which is less than the force exerted to contract the other deformable portion against such tube so as to provide increased vibration resistance.

References Cited by the Examiner

UNITED STATES PATENTS

| | | | |
|---|---|---|---|
| 650,330 | 5/00 | Kurtz | 285—341 |
| 1,337,547 | 4/30 | Dohner | 285—382.7 X |
| 2,287,889 | 6/42 | Krumsiek et al. | 285—382.7 X |
| 2,344,032 | 3/44 | Eden | 285—382.7 |
| 2,406,488 | 8/46 | Brock | 285—382.7 X |
| 2,473,118 | 6/49 | Wolfram | 285—382.7 X |
| 2,496,510 | 2/50 | Wolfram | 285—341 |
| 3,055,684 | 9/62 | Currie | 285—382.7 |

FOREIGN PATENTS

| | | |
|---|---|---|
| 1,222,909 | 1/60 | France. |
| 867,334 | 3/55 | Germany. |
| 569,135 | 5/45 | Great Britain. |
| 749,395 | 5/56 | Great Britain. |
| 852,135 | 5/45 | Great Britain. |
| 339,447 | 8/44 | Switzerland. |

CARL W. TOMLIN, *Primary Examiner.*